(12) United States Patent
Gruener

(10) Patent No.: US 10,625,685 B1
(45) Date of Patent: Apr. 21, 2020

(54) STORAGE CONTAINER FOR AN EXTERIOR OF A VEHICLE

(71) Applicant: Adam Gruener, Mission Viejo, CA (US)

(72) Inventor: Adam Gruener, Mission Viejo, CA (US)

( * ) Notice: Subject to any disclaimer, the term of this patent is extended or adjusted under 35 U.S.C. 154(b) by 0 days.

(21) Appl. No.: 15/988,272

(22) Filed: May 24, 2018

(51) Int. Cl.
*B60R 9/06* (2006.01)
*B60R 19/38* (2006.01)
*B60R 11/00* (2006.01)

(52) U.S. Cl.
CPC ............... *B60R 9/06* (2013.01); *B60R 19/38* (2013.01); *B60R 2011/004* (2013.01); *B60R 2011/0071* (2013.01)

(58) Field of Classification Search
CPC ..... B60R 9/06; B60R 19/38; B60R 2011/004; B60R 2011/071
USPC ........................................................ 224/42.13
See application file for complete search history.

(56) References Cited

U.S. PATENT DOCUMENTS

| | | | | |
|---|---|---|---|---|
| 1,008,680 A | * | 11/1911 | Temple | B62D 43/02 224/42.14 |
| 4,498,614 A | * | 2/1985 | Guarr | B60R 11/06 224/42.13 |
| 4,911,343 A | * | 3/1990 | Lords | B60R 11/00 224/42.13 |
| 4,917,279 A | * | 4/1990 | Brow | B25H 3/02 206/373 |
| 5,118,017 A | | 6/1992 | Buck | |
| 5,203,479 A | | 4/1993 | Lucas | |
| 5,228,608 A | * | 7/1993 | Stout, III | B62D 43/005 224/42.13 |
| 5,429,285 A | * | 7/1995 | Kim | B60R 11/06 206/373 |

(Continued)

FOREIGN PATENT DOCUMENTS

| | | |
|---|---|---|
| EP | 1335851 | 11/2004 |
| WO | 2011156781 | 12/2011 |

OTHER PUBLICATIONS

"Overland Journal: G-Wagen | p. 9 | Expedition Portal," expeditionportal.com, <https://www.expeditionportal.com/forum/threads/overland-journal-g-wagen.22731/page-9>, post dated Feb. 10, 2010, printed on Dec. 21, 2018.

(Continued)

*Primary Examiner* — Peter N Helvey
(74) *Attorney, Agent, or Firm* — Hanrahan Law Firm, P.A.; Benjamin M. Hanrahan

(57) ABSTRACT

A storage container configured for attachment to an exterior of a vehicle and for retaining a plurality of items is presented herein. The storage container includes a body defining an at least partially open interior portion. The body includes a base, at least one wall extending from the base and terminating at an open end, and a lid. The base includes a plurality of holes extending between an interior surface and an exterior surface. A mounting assembly is threaded through two of the holes in the base and around a portion of the vehicle, in order to secure the storage container to the vehicle. A plurality of retaining devices may also be positioned through at least some of the holes of the base in order to removably secure one or more stored items or tools against the interior surface of the base.

20 Claims, 8 Drawing Sheets

(56) References Cited

U.S. PATENT DOCUMENTS

| | | | | |
|---|---|---|---|---|
| 5,462,211 A | * | 10/1995 | Eversoll | B60R 9/06 224/42.13 |
| 6,026,999 A | | 2/2000 | Wakefield | |
| 6,336,671 B1 | * | 1/2002 | Leonardi | B60R 5/04 224/42.13 |
| 7,036,697 B2 | * | 5/2006 | Hwang | B60R 11/06 206/373 |
| 7,708,175 B2 | * | 5/2010 | Edwards | B60R 11/06 224/42.14 |
| 9,802,659 B2 | * | 10/2017 | Anderson | B62D 43/02 |

OTHER PUBLICATIONS

"Free Irack Jack Mount—Jeep Wrangler Forum," wranglerforum.com, <https://www.wranglerforum.com/f123/free-irack-jack-mount-1738553.html>, published on May 26, 2016, printed on Dec. 21, 2018.

"Smittybuilt Irack II Intelligent Rack Mounting System—Powdercoat Black," Morris 4×4 Center,—Web page at <https://www.morris4x4center.com/smittybilt-irack-ii-intelligence-racking-system-sb-2739.html>, 6 pages, published on Jun. 6, 2017, retrieved from Internet Archive Wayback Machine at <https://web.archive.org/web/20170606082849/https://www.morris4x4center.com/smittybilt-irack-ii-intelligence-racking-system-sb-2739.html> on Dec. 21, 2018.

"Rear Spare Wheel Cover With Lockable Compartment for Mercedes Gwagen," <https://www.g-wagenaccessories.com/products/rear-spare-wheel-cover-with-lockable-compartment-for-mercedes-gwagen>, accessed on Mar. 28, 2018.

"Daystar Universal Cam Cans," daystarsuspensionparts.com, <https://www.daystarsuspensionparts.com/daystar-universal-cam-cans.asp>, accessed on or before Mar. 30, 2018, printed on Dec. 21, 2018.

"JCR Offroad Adventure Tire Carriers—R~ealtruck.com," realtruck.com, <https://www.realtruck.com/jcr-offroad-adventure-tire-carriers/>, accessed on or before Mar. 30, 2018, printed Dec. 21, 2018.

"Trasharoo Spare Tire Trash Bag Black Open Box: Sports & Outdoors," amazon.com, <https://www.amazon.com/Trasharoo-Spare-Tire-Trash-BLACK/dp/B003TXVZE0/ref=sr_1_1?ie=UTF8&qid=1520813977&sr=8-1&keywords=trasharoo&dpID=51tk5JFbHLL&preST=_SY300_QL70_&dpSrc=srch>, accessed on or before Mar. 30, 2018, printed on Dec. 21, 2018.

* cited by examiner

STORAGE CONTAINER FOR AN EXTERIOR OF A VEHICLE

FIELD OF THE INVENTION

The present invention is generally directed to a storage container or gear box that can be secured or universally affixed to an exterior of a vehicle, including, but not limited to a spare tire assembly, ladder or other mounted equipment, roll bar, rack, or location. The container includes a plurality of holes or apertures in a base, through which a flexible mounting strap or assembly is passed for attachment to the vehicle. Other embodiments include one or more retaining straps that can be secured through some of the holes for retaining or securing items within the container.

BACKGROUND OF THE INVENTION

It is often desirable to extend or add to the cargo capacity of a vehicle, particularly in cases of operating a vehicle in an off-road environment, although it may also be desired to extend the cargo capacity of a daily driven vehicle or a vehicle driven on a long-haul trip.

Particularly, off-roading can be defined or referred to as the activity of driving a vehicle on an unpaved or in an unsurfaced area that may include sand, rocks, gravel, mud, dirt, and other like terrain. Due to the nature of off-road terrain or environments, it is common for many off-road enthusiasts to bring various equipment, tools or other items that may be helpful to recover a vehicle in the event the vehicle becomes stuck, or to repair the vehicle in the event the vehicle becomes at least partially inoperable or broken. These items may often include, but are certainly not limited to one or more tow straps, bailing wire, tools (e.g., wrenches, hammers, screw drivers, etc.), shackles, gloves, fire extinguishers, or other roadside emergency equipment.

Simply tossing or storing these items in the vehicle (e.g., in the trunk, rear cargo area, passenger area, back seat, front seat, etc.) is often not desirable in that, while operating the vehicle in an off-road environment, the tools or other items can be tossed around causing damage to the vehicle or, at a minimum, creating a distraction or nuisance to the driver or passenger(s) of the vehicle. In some situations, particularly in the event the vehicle has a removable or partially removable top, such as in the case of a JEEP® WRANGLER®, for example, the tools or other items can also be tossed out of the vehicle during off-road operation.

Accordingly, in order to at least partially contain the tools or items, it may be common to place the tools or items in a bag or tool box that is then set into the trunk, cargo area, or passenger area of the vehicle. While this may be used to store some of the items within the bag or tool box, it will still occupy a large area of the vehicle and can still cause a distraction to the driver and passenger(s). For example, the tools or items can still be tossed around within the tool box, and the tool box itself can be tossed around the interior of the vehicle.

Accordingly, there is a need in the art for a storage container or gear box that can securely and easily attached to the vehicle, for example to the exterior of a vehicle, such as, a spare tire assembly, ladder, roll bar(s), roof rack(s), or other equipment, and which can securely retain a number of items, tools, or other equipment therein. It would be beneficial if the proposed storage container is able to universally attach or mount to virtually any sized spare tire assembly or other equipment or portion of the vehicle. It would also be advantageous if the storage container is easily attachable and detachable to the vehicle, allowing the user to easily mount the storage container when needed, and to detach or remove the storage container when it is not needed.

Other advantage of the proposed storage container may include the ability to securely and removably retain the items or tools within the container via one or more retention devices or straps. This would help prevent the items or tools from significantly shifting or bouncing around within the container during off-road operation and allows the retained items or tools to be easily accessed when needed.

SUMMARY OF THE INVENTION

Accordingly, the present invention is directed to a storage container or gear box configured for attachment to an exterior of a vehicle and for retaining a plurality of items therein, particularly, but certainly not limited to during times of operating the vehicle in an off-road environment. Particularly, the storage container of at least one embodiment includes a body defining an at least partially open interior portion. The body includes a base, at least one wall extending from the base and terminating at an open end, and a lid.

For instance, the base of at least one embodiment has a plurality of holes extending between an interior surface and an exterior surface. A mounting assembly, which may in some embodiments be in the form of a flexible mounting strap, can be threaded or otherwise positioned through two of the holes in the base and around a portion of the vehicle, in order to secure the storage container to the vehicle. For example, the flexible mounting strap may wrap around or secure to a portion of the vehicle that is positioned behind or proximate the exterior surface of the base.

In particular, in the case of a spare tire assembly, a portion of the mounting strap may pass through one of the holes in the base, around a portion of the spare tire assembly (e.g., around one of the spokes of the wheel), through another hole in the base, and secured (e.g., via a ratcheting or other mechanism) within the interior portion of the container. With the mounting strap secured on the inside of the container and hidden either behind the base or within the spare tire assembly, tampering with, or external access to, the mounting assembly is restricted. It should be noted that the flexible mounting strap of at least one embodiment, along with the plurality of holes disposed through the base of the container, allow the container to be universally mounted to virtually any spare tire assembly of any size or to other equipment or portions of the vehicle.

Additional features of at least one embodiment of the present invention include a plurality of retaining straps or devices positioned through at least some of the holes of the base. The retaining straps are configured to removably secure at least some of the stored items or tools against the interior surface of the base. The retaining device(s) may be in the form of VELCRO® straps or straps having other hook-and-loop type fasteners, snaps, buttons, clips, etc.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
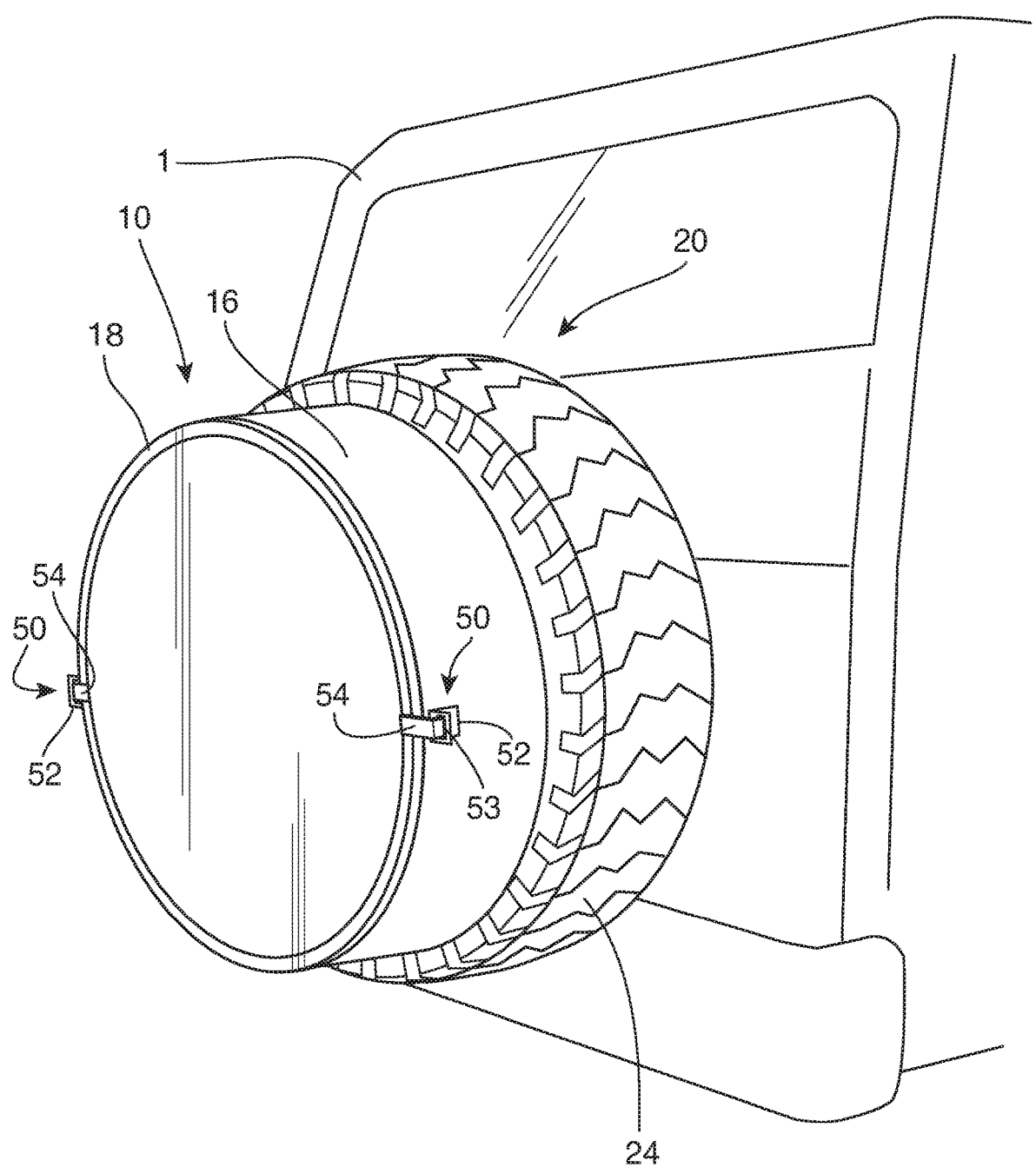
FIG. 1 is a perspective view of the storage container mounted to a rear spare tire assembly of a vehicle as disclosed in accordance with at least one embodiment of the present invention.

As shown in the accompanying drawings, and with particular reference to FIG. 1, the present invention is directed to a storage container or gear box, generally indicated with reference character 10, for use with or otherwise attachable to an exterior or external equipment of a vehicle 1. In particular, as described herein, the storage container 10 can be used to store, retain and/or organize various tools, equipment, or other items 5 including but in no way limited to emergency roadside equipment, one or more tow straps, bailing wire, tools, shackles, gloves, fire extinguishers, jacks, wrenches, screw drivers, etc. These stored items 5 can often be helpful and easily accessible during an off-road excursion and can often be used to recover a vehicle 1 that may be stuck, broken or otherwise at least partially inoperable.

In this manner, the vehicle 1, in many applications or implementations of the various embodiments of the present invention, can be an off-road vehicle, such a sport utility vehicle (SUV) (e.g., a JEEP® WRANGLER® or LAND ROVER® RANGE ROVER®), a pick-up truck, an all-terrain vehicle (ATV), quad, three-wheeler, etc. Many of these vehicles are equipped with an external or exposed spare tire assembly 20 which includes a spare tire mounted to a spare wheel or rim. The spare tire assembly 20 is often mounted to the vehicle 1, such as to the rear of the vehicle 1, on top of the vehicle 1, or in other locations. In this manner, the storage container 10, as described herein, may, in some embodiments or implementations, be secured, affixed or mounted to the spare tire assembly 20, for example, via a mounting assembly or mounting strap 30. However, as is apparent from the description herein, the versatility of the mounting strap 30 of certain embodiments of the present invention allows the storage container 10 to be mounted or affixed to other portions or other equipment of the vehicle 1, whether external or internal, such as, for example, an external ladder, rack, bars (e.g., roll bars) or brackets. In this manner, while the drawings represented in FIGS. 1 through 4 illustrate the container 10 secured to a spare tire assembly 20, the mounting assembly or strap 30 can be used to secure the container 10 to other portions or equipment of the vehicle 1, and thus, use of the present invention is not limited to the spare tire assembly 20.

It should also be noted, however, that the various embodiments of the storage container 10 of the present invention can be mounted to many type of vehicles, whether used or intended for off-road purposes, street driving, or otherwise, so long as the vehicle 1 has an available, accessible or exposed structure or equipment to which the storage container 10 can attach, for example, via the mounting straps 30. Of course, virtually any item 15 that can fit within the storage container 10 can be stored therein, and thus, the stored items 5 described herein are certainly not limited to tools or items that can be helpful in off-road situations or environments.

Figure 2:
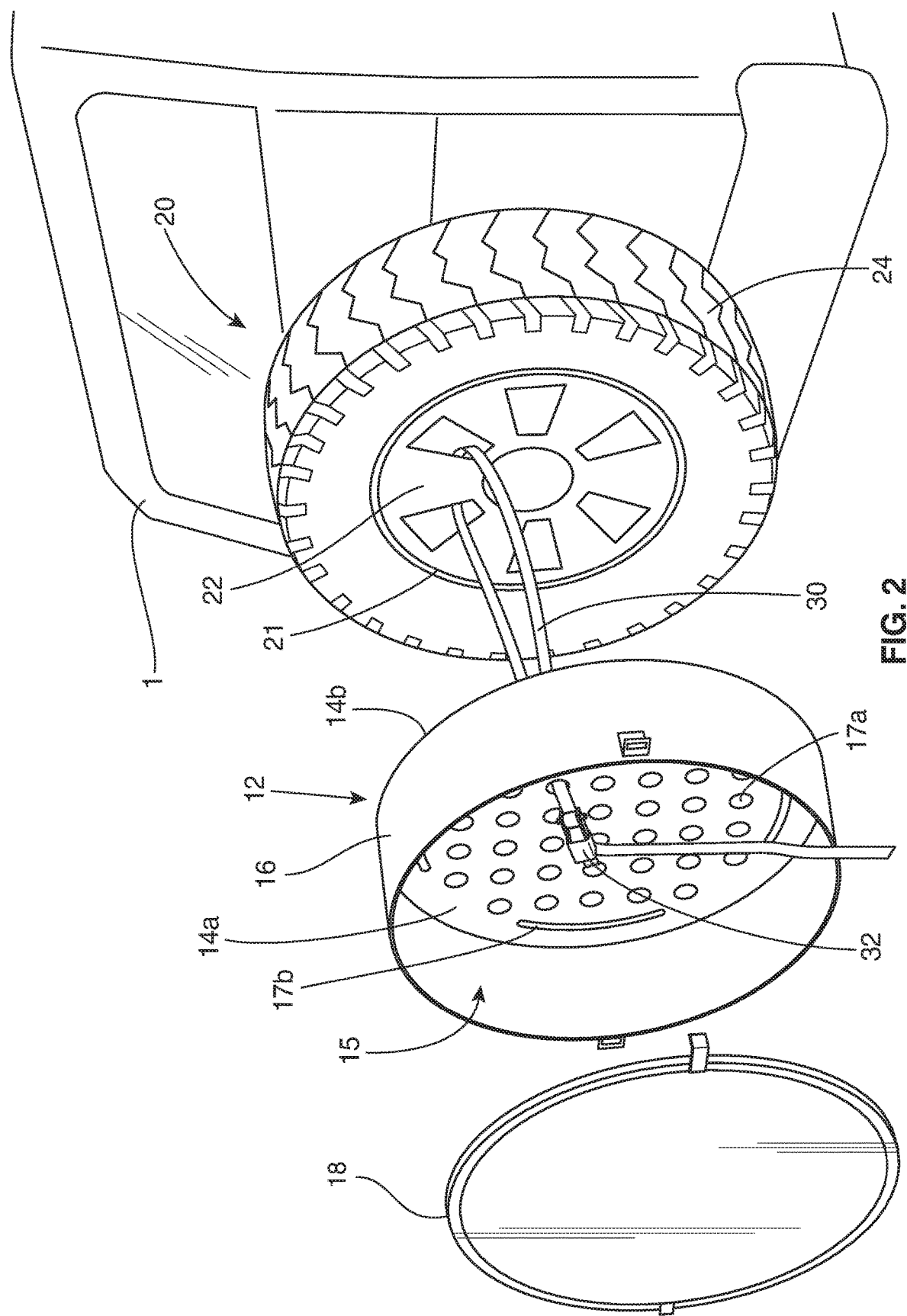
FIG. 2 is an exploded perspective view of the storage container as disclosed in accordance with at least one embodiment of the present invention.
Figure 3:
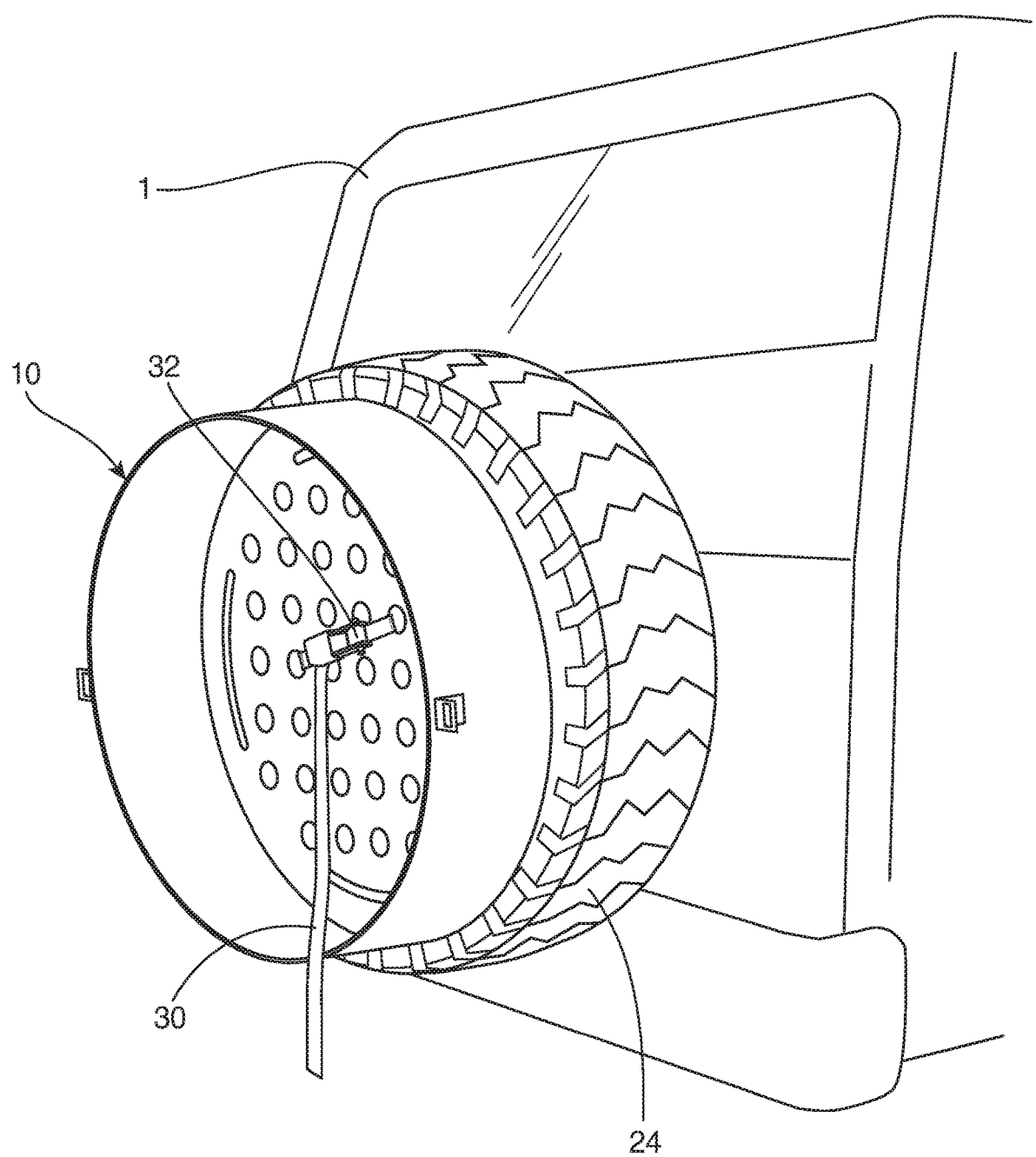
FIG. 3 is a perspective view of the storage container with the lid removed and with the body mounted to a rear spare tire assembly of a vehicle as disclosed in accordance with at least one embodiment of the present invention.
Figure 4:
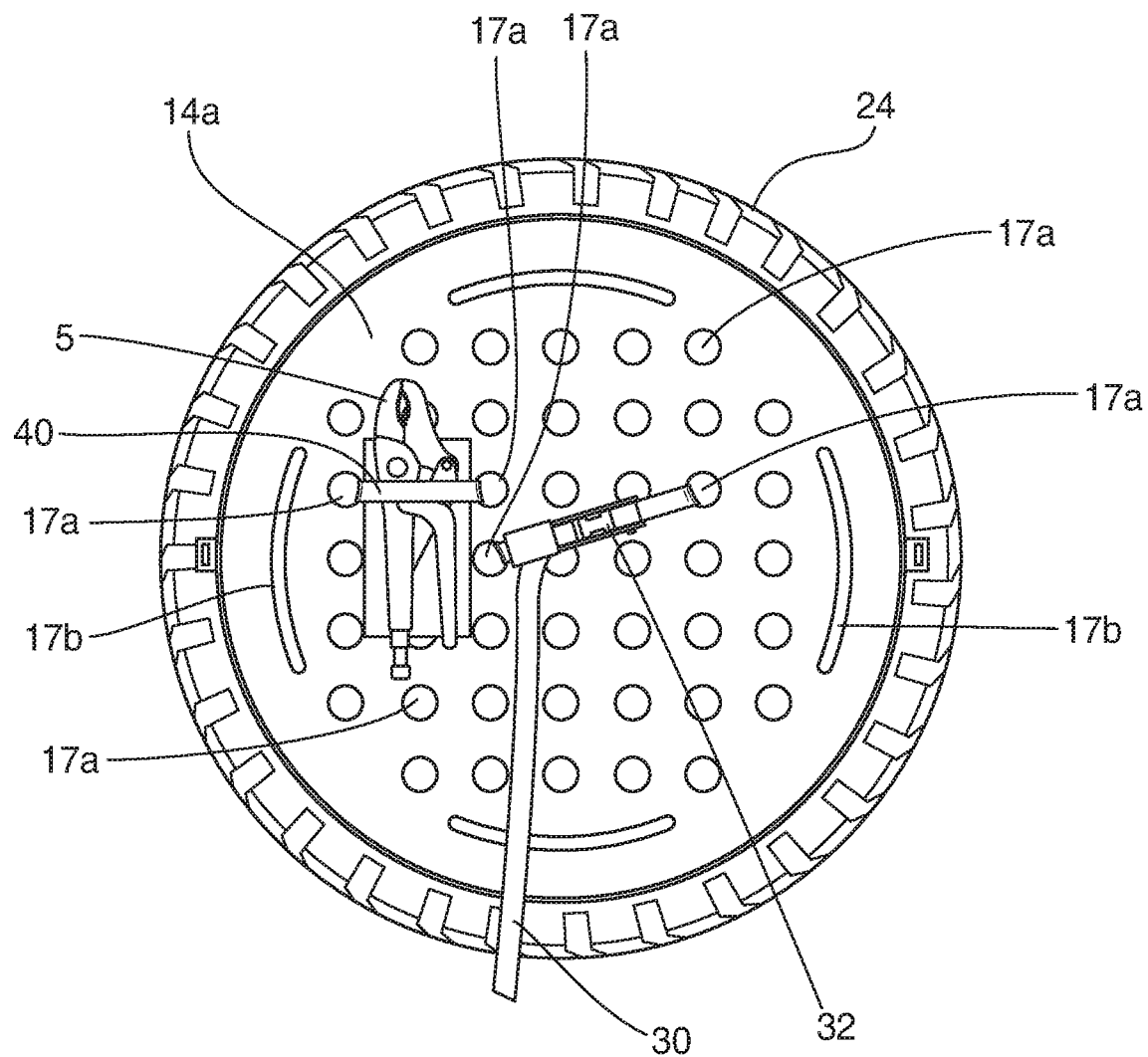
FIG. 4 is a plan view of the storage container with the lid removed and with the body mounted to a spare tire assembly as disclosed in accordance with at least one embodiment of the present invention.

Furthermore, with reference now to FIGS. 2 through 4, the container 10 of the various embodiments includes a body 12 defined by a base 14, at least one wall 16 and a lid 18. In some embodiments, the container 10, and in particular, the body 12 thereof, has a cylindrical shape or configuration with a cylindrical wall 16 extending out from the base 14 and terminating at an open end, where the lid 18 is secured. In such an embodiment, the container 10 will have a circular or oval cross-section taken through the body 12, for example, parallel to the lid 18 or base 14. Other embodiments within the full spirit and scope of the present invention may be constructed of different shapes, e.g., three-dimensional shapes having a square, rectangular, octagonal cross-sections, etc. Some embodiments may also be constructed with a flared or tapering configuration such that the diameter or area of the base 14 may be larger or smaller than the diameter or area of the lid 18.

In any event, the storage container 10 of the various embodiments defines an at least partially open interior portion 15, within which the one or more items 5 can be stored, retained or organized, as described herein. The body 12 of the container 10 can be constructed of a rigid and durable material, including but not limited to plastic, metal or a combination of materials.

Furthermore, the base 14 is defined as comprising an interior surface 14a and an exterior surface 14b, where the interior surface 14a faces or is exposed to the interior portion 15 of the container 10, and the exterior surface 14b is opposite the interior surface 14a and facing the exterior of the container 10. A plurality of holes, apertures or openings 17a, 17b are disposed through the base 14, for example, extending between the interior surface 14a and the exterior surface 14b of the base 14. As described herein, these holes 17a, 17b in the base 14 of at least one embodiment of the container 10 can be used, for example by the mounting assembly 30 or mounting strap, to mount the container 10 to the vehicle 1 or to a portion or equipment attached to the vehicle 1, such as a spare tire assembly 20, ladder, etc. In other embodiments, the holes 17a, 17b may be used to organize or retain items 5 to the interior portion 15 of the container 10, and in particular to the interior surface 14a of the base 14, for example, via one or more retaining straps or devices 40.

Figure 5:
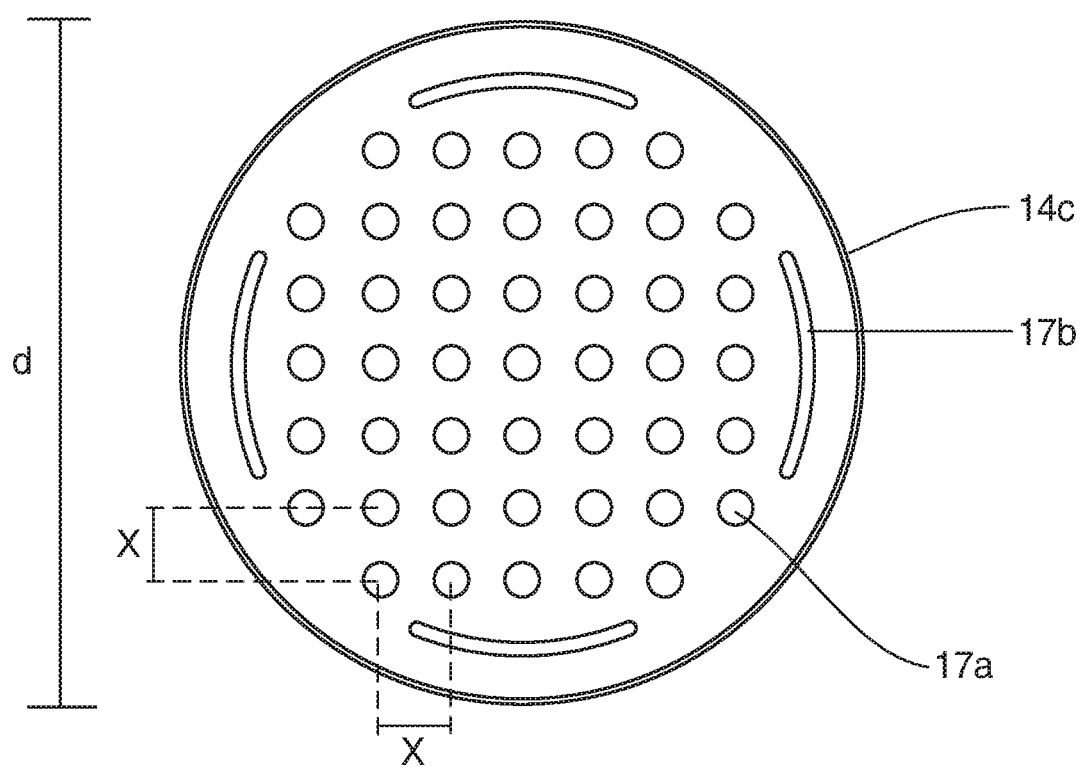
FIG. 5 is a plan view of the base of the storage container as disclosed in accordance with at least one embodiment of the present invention.

Particularly, with reference to FIG. 5, the base 14 of at least one embodiment includes a plurality of holes 17a, 17b spread throughout a majority of the surface area of the base 14. For example, at least some of the holes 17a may include a circular or substantially circular configuration or shape and may be uniformly or non-uniformly spread out over or about the majority of the surface area of the base 14. In this manner, the holes 17a, 17b and in particular the layout or pattern represented by the holes 17a, 17b of at least one embodiment do not or are not intended to match or conform with any particular bolt or lug nut pattern of a spare tire assembly 20, or of any particular mount or equipment mounted to the vehicle 1.

Accordingly, as will become apparent from the description provided herein, the storage container 10 of at least one embodiment of the present invention can be universally mounted to a number of different locations on the vehicle 1 and is not limited to mounting to any particular wheel, with any particular bolt or lug nut pattern or any particular size. In this manner, a single storage container 10 constructed in accordance with at least one embodiment of the present invention can be considered universally mountable not only to spare tire assemblies 20 having wheels or tires of different sizes (e.g., 29-inch tires, 32-inch tires, 35-inch tires, 37-inch tires, etc.), but also to other locations or equipment on the vehicle 1. This can be particularly helpful in situations where the vehicle 1 does not have an externally mounted spare tire assembly 20, or in situations where the user would prefer, for whatever reason, to mount the container assembly 10 of the present invention to a different location on the vehicle 1.

Still referring to the exemplary embodiment of FIG. 5, the base 14 may include a plurality of circular holes 17a and at least one or more elongated holes 17b. For example, the elongated hole(s) 17b may include a generally lengthened or elongated configuration, as illustrated. In some cases, the elongated holes 17b may also include a partial curve or bend, for example, at least substantially matching the rounded curve of the peripheral edge 14c of the base 14. As illustrated, the elongated holes 17b may be positioned proximate the peripheral edge 14c of the base 14, for example, at least partially surrounding the other holes 17a, between the peripheral edge 14c and the other holes 17a, or other locations on the base 14. It should be noted that the elongated configuration of at least some of the holes 17b can provide additional versatility and/or positioning of the mounting strap(s) 30 and/or retaining strap(s) 40 described herein, thereby providing additional versatility in mounting the container 10 to the vehicle 1 or retaining items 5 within the interior portion 15 of the container 10.

Still referring to FIG. 5, the base 14 may include a plurality of more than twenty (20) holes 17a, 17b, and in some cases up to forty-five (45) or more holes 17a, 17b. The embodiment illustrated in FIG. 5, for example, includes forty-five (45) round holes 17a and four (4) elongated holes 17b, although other embodiments may include more or less holes 17a, 17b.

As just an example, the round holes 17a illustrated in FIG. 5 are uniformly dispersed in even rows and columns and spread about the majority of the base 14. For instance, the holes 17a are dispersed about the base 14 proximate the outer peripheral edge 14c and evenly or unevenly throughout the center or internal area or region of the base 14. In the example shown, each of the round holes 17a include a radius of approximately 0.625 inches (or a diameter of approximately 1.25 inches). The center of each round hole 17a is approximately 2.5 inches from the center of an adjacent round hole 17a, illustrated as reference character x. In this example, the diameter d of the base 14 is approximately 23.5 inches. Of course, these measurements and distances are provided for illustrative and exemplary purposes only and should not be considered limiting in any manner.

With reference again to FIGS. 2, 3 and 4, at least one embodiment of the present invention includes a mounting assembly 30 that is configured to affix or mount the storage container 10 to the vehicle 1, such as to an exterior of the vehicle or to equipment mounted on the vehicle 1, such as a spare tire assembly 20, ladder, roll bars, roof rack, etc. As illustrated, the mounting assembly 30 may be selectively passed through any one or more of the holes 17a, 17b (although more practically two different holes) on the base 14 and secured through and/or around a portion of the vehicle 1.

In the example shown, the mounting assembly 30 includes a flexible strap that is adjustable, such as through a ratcheting mechanism 32, although other straps or flexible and/or adjustable mounting assemblies are contemplated within the full spirit and scope of the present invention. In the case of a flexible strap or other like mounting assembly 30, the strap (e.g., one end or portion of the strap) can be threaded through one of the holes 17a, 17b of the base 14, around a portion of the vehicle 1, through another hole 17a, 17b, and secured via the ratcheting or other like mechanism 32. It should be noted that while the strap or mounting assembly 30 is most practically threaded through two different holes 17a, 17b, it is contemplated that a single hole 17a, 17b could potentially be used so long as the ratcheting mechanism 32 or other portion of the mounting assembly 30 is too large to pass through the hole 17a, 17b or is otherwise restricted in some way from passing through the hole 17am 17b.

Also, in the example shown, the strap or mounting assembly 30 is secured through the spokes 22 of a wheel 21 of a spare tire assembly 20 mounted to the rear of the vehicle 1. Specifically, as described above, many off-road vehicles or SUVs, such as JEEP® WRANGLERS®, have rear-mounted spare tire assemblies 20 that include a spare tire 24, mounted on a spare wheel or rim 21, that is mounted to the vehicle 1, for example, via a bracket.

In one exemplary implementation of the present invention, as shown in the exploded view of FIG. 2, the mounting strap 30 may be threaded or secured around one or more of the spokes 22 of the spare wheel 21 disposed directly behind the base 14. With the ratchet mechanism 32 or other like securing device of the mounting assembly 30 positioned within the interior portion 15 of the container 10, for example, when the container 10 is secured against the spare tire assembly 20, as shown in FIGS. 3 and 4, the portion of mounting strap 30 not positioned within the container 10 is substantially or entirely hidden behind the base 14 or within the wheel 21 of the spare tire assembly 20. In this manner, access to the strap 30 when the container 10 is mounted to the vehicle 1 in many instances is restricted or eliminated, thereby restricting or eliminating the ability for another person to tamper with the strap or other mounting assembly 30.

It should be noted, however, that in other embodiments, the mounting strap 30 may be threaded through the wheel 21, around the external surface of the tire 24, and through the hole(s) 17a, 17b of the container 10 for attachment to the vehicle 1. Also, due to the flexible nature of the mounting strap 30 of at least one embodiment, the container 10 may be universally mounted to virtually any spare tire assembly 20 of any size and with any bolt or lug pattern. Specifically, since the bolts or lugs of the spare tire assembly 20 are not used, in any way, to mount the storage container 10 of at least one embodiment of the present invention to the vehicle 1, the bolt or lug pattern will not, in any way, limit or restrict the use of such an embodiment in the intended manner. Also, the size of the wheel or tire will not restrict the use of at least one embodiment of the present invention in the intended manner in that the flexible nature of the mounting strap or other mounting assembly 30 and the ability for the mounting strap or other mounting assembly 30 to secure through the spoke(s) 22 of the wheel 21 allow the container 10 to be mounted to a tire assembly 20 or wheel 21 of virtually any size.

In addition, the pattern or layout of the holes 17a, 17b on the base 14 of at least one embodiment are not modeled after any bolt or lug nut pattern or any pattern or design pertaining to a spare tire or other mounting location. Rather, since there are so many holes 17a, 17b available, and spread throughout the majority of the area of the base 14, the mounting strap(s) 30 can be positioned through any one or more of the holes 17a, 17b to accommodate different mounting locations on the vehicle 1, not limited to the spare tire assembly 20.

Moreover, additional features of certain embodiments of the present invention are also shown in FIG. 4. Particularly, the holes 17a, 17b may also be configured to receive one or more retaining devices 40 there through. Specifically, the retaining device(s) 40 can be used to temporarily or removably secure, retain or organize one or more items 5 stored within the interior portion 15 of the container 10, for example, by retaining the item 5 to or against the interior surface 14a of the base 14. This can be beneficial for organizing the items 5 within the interior portion 15, for example, so that the item(s) 5 are easily located in time of need, and/or for securing the item(s) 5 within the interior portion 15 to prevent them from bouncing around or significantly moving during operation of the vehicle 1.

Specifically, in some embodiments, the retaining strap(s) or device(s) 40 may be threaded or disposed through at least two of the holes 17a, 17b, such that a portion of the strap or retaining device 40 abuts against the exterior surface 14b of the base 14, while another portion of the strap(s) or retaining device(s) 40 extends to the interior portion 15 of the container 10. In this manner, the strap(s) or retaining device(s) 40 can wrap at least partially around or other engage in some manner one or more items 5 in order to secure the item(s) 5 to the interior portion 15 of the container 10. For instance, the stored or retained items 5 may be pressed against or retained to the interior surface 14a of the base 14 via the retaining device(s) 14.

Accordingly, the retaining strap(s) or device(s) 40 of at least one embodiment can be in the form of a VELCRO® strap or a strap that includes hook-and-loop type fasteners, allowing the ends or portions of the strap or device 40 to secure to one another, forming a loop. Other embodiments of the retaining device(s) 40 may include one or more bungee cords or straps with other attachment mechanisms, such as snaps, hooks, buttons, etc. In either event, the retaining device(s) 40 are structured and configured to be selectively passed through the holes 17a, 17b of the base 14 in a manner to allow the one or more items 5 to be removably secured or retained thereto.

The various holes 17a, 17b, including the round holes 17a, elongated holes 17b, or other holes that may be incorporated into other embodiments allows a user to selectively attach or removably retain virtually any item 5 to various locations on the base 14. For instance, since the holes 17a, 17b of at least one embodiment are dispersed substantially about the majority of the base 14, for example, extending in a uniform or non-uniform manner from a location proximate the peripheral edge 14c and throughout the center or interior area of the base 14, the item(s) 5 can be secured or retained to the base 14 in a number of different locations. In addition, because of the rounded, circular and/or elongated configuration of the holes 17a, 17b, the retaining strap(s) 40 are able to be positioned or extended through the holes 17a, 17b in virtually any direction, including up, left, right, down or any 360-degree direction extending from the corresponding hole 17a, 17b.

It should also be noted that, in some embodiments, although not shown in the Figures, one or more retaining device(s) may be permanently affixed or connected to some locations of the base 14 for removable retention of stored items 5.

Additional features of at least one embodiment of the present invention include a lid 18 that is at least partially removable or is otherwise able to be selectively opened and closed in order to provide and restrict access to the interior portion 15 of the container 15. For example, in the embodiment illustrated, the lid 18 can be completely removed, although other embodiments may include a lid that attached via a hinge or other like device such that the lid can be pivoted between the open and closed positions.

For instance, with reference to FIGS. 3 and 4, at least one embodiment of the present invention includes one or more locking or latch assemblies 50 configured to secure the lid 18 in the closed position relative to the rest of the body 12. Specifically, the locking or latch assembly 50 of at least one embodiment includes a bracket 52 secured to the body 12 and a latch arm 54 attached to the lid 18. In operation, at least a portion of the latch arm 54 of at least one embodiment will pass through an opening or aperture 53 of the bracket 52. An integrated locking assembly (not shown) may be included to lock the latch arm 54 to the bracket 54, such that a key, code, combination, etc. may be needed in order to disengage the latch arm 54 from the bracket 52.

In other embodiments the latch arm 54 may include a hole or aperture through which a portable lock, such as a padlock or shackle, may be passed. In this manner, the lid 18 would be locked to the rest of the body 12 until the padlock or other lock is removed from the latch arm 52, thereby allowing the latch arm 52 to be removed from the hole 53 of the bracket 52.

Other locking assemblies or latch assemblies structured and configured to removably engage or lock the lid 18 in a closed position relative to the rest of the body 12 are contemplated within the full spirit and scope of the various embodiment of the present invention.

Figure 6:
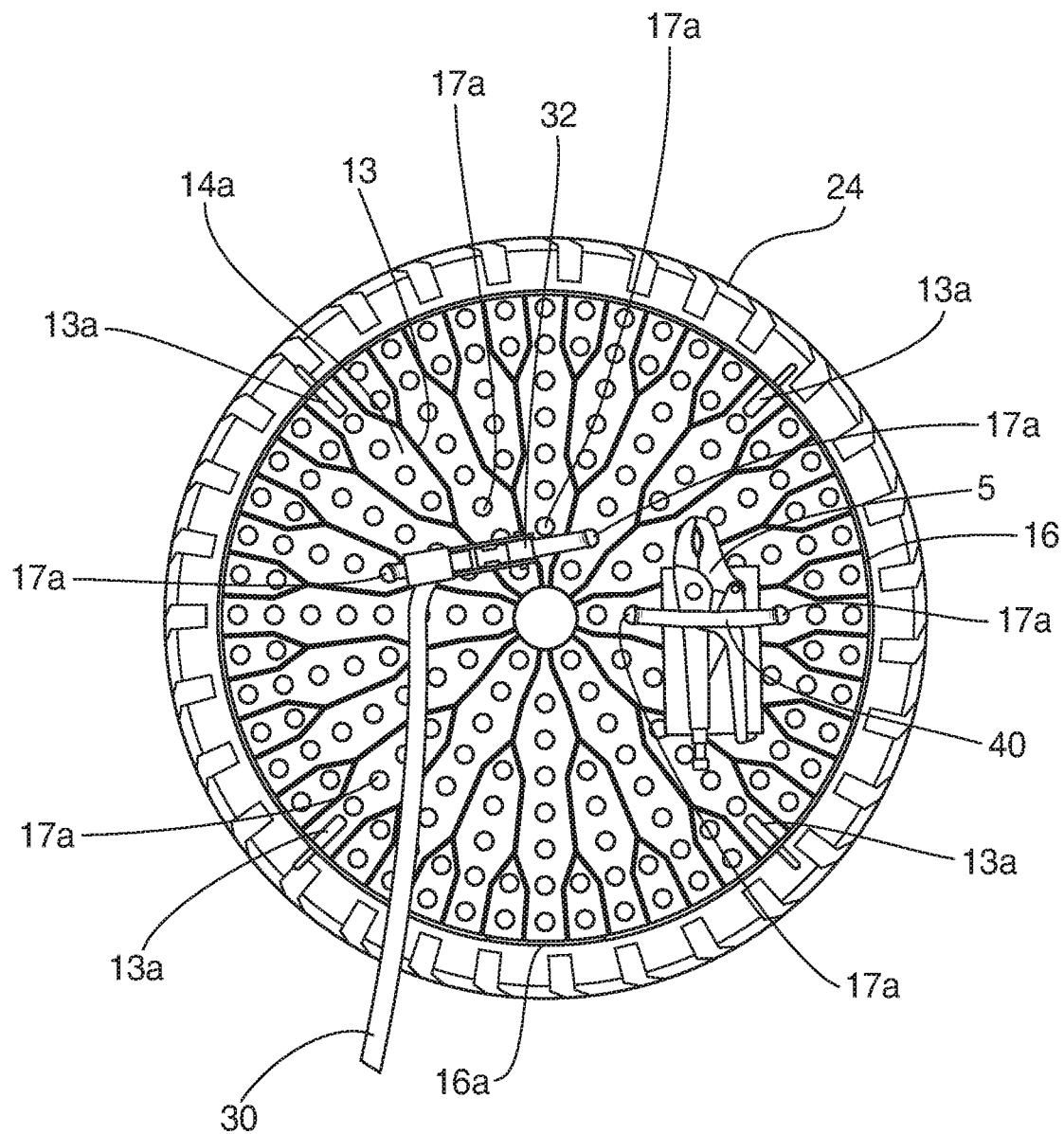
FIG. 6 is a plan view of the storage container with the lid removed and with the body mounted to a spare tire assembly as disclosed in accordance with another embodiment of the present invention.
Figure 7:
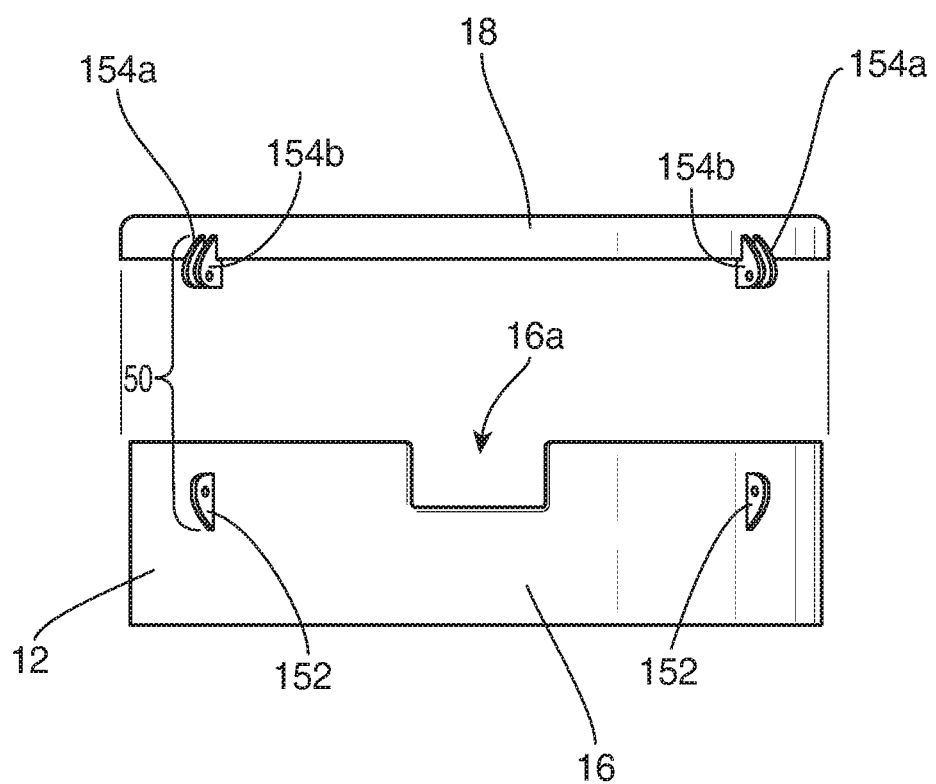
FIG. 7 is a bottom plan view of the storage container illustrating an access opening disposed through the side wall, as disclosed in accordance with at least one embodiment of the present invention.
Figure 8:
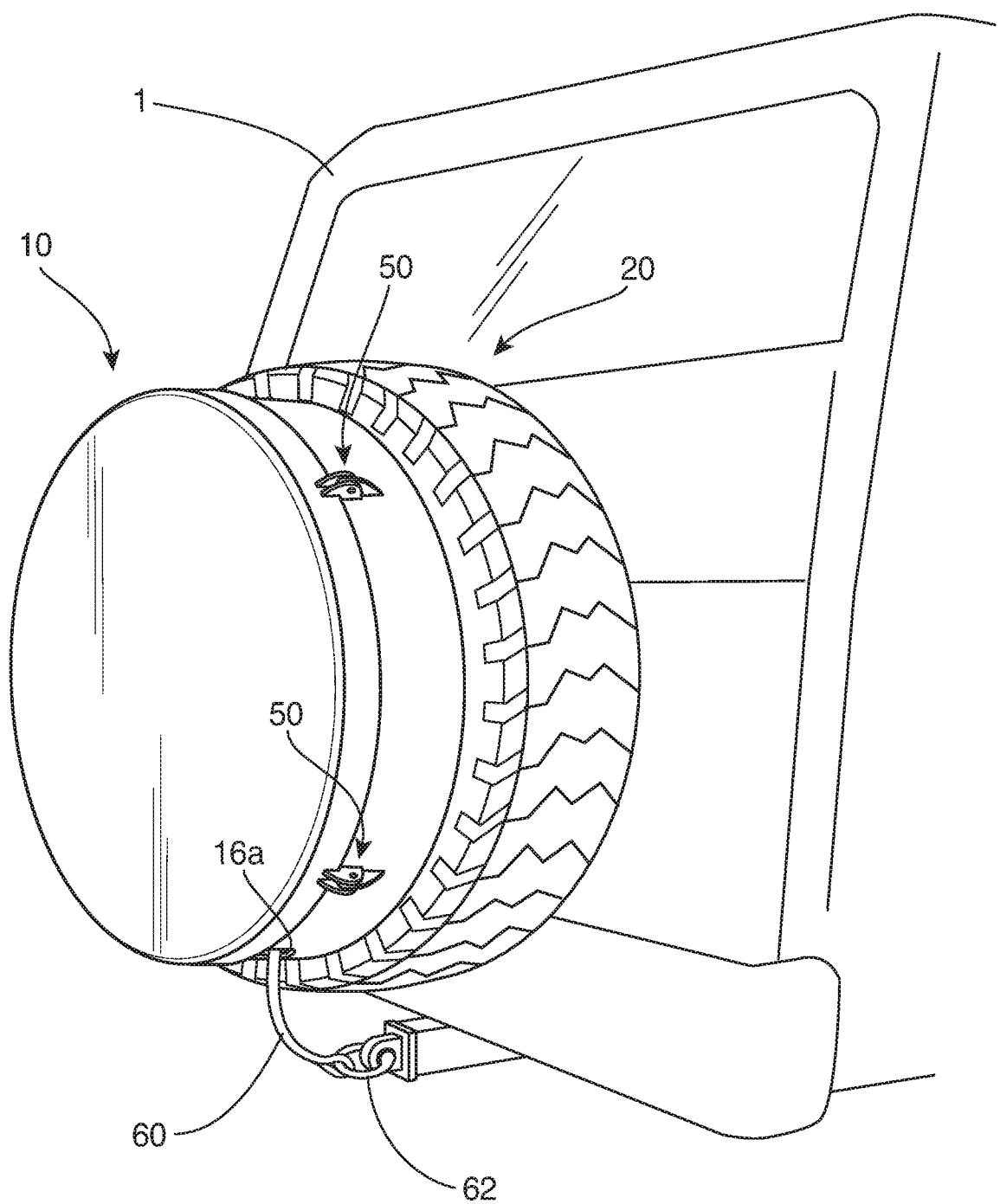
FIG. 8 is a perspective view of the storage container illustrated in FIG. 7.

With reference now to FIGS. 6, 7 and 8, additional embodiments of the storage container 10 or gear box are illustrated. For example, in the embodiment illustrated in FIG. 6, the base 14 includes a plurality of holes 17a spread about or otherwise spanning about a majority of the surface area of the base 14 from or proximate to the outer peripheral edge to or proximate to the center thereof. In this embodiment, all of the holes 17a include a round configuration, although it should be noted that the holes 17a of this and other embodiments may be constructed of virtually any shape.

In addition, the base 14 of at least one embodiment may include a plurality of reinforcement ribs 13, as illustrated in FIG. 6. Particularly, the ribs 13 may include enlarged, thickened, or raised portions on the base 14 that are configured to provide additional stability, support and reinforcement to the strength of the base 14. For instance, with a plurality of holes 17a spanning or spread about the surface area of the base 14, the integrity of the base 14 may be at least partially compromised. The addition of a plurality of reinforcement ribs 13, as shown, may be used to add strength and integrity to the base 14. Accordingly, as an example, the plurality of reinforcement ribs 13 may extend radially about the base 14 from or proximate to the center of the base 14 outward toward or proximate the outer peripheral edge. The ribs 13 may be constructed in a plurality of different patterns, and thus the pattern shown in FIG. 6 should be considered exemplary and not limiting.

Additional embodiments may include reinforcements 13*a* at the periphery of the base 14 and attached to side wall 16. For instance, the reinforcements 13*a* may extend from the base 14 and at least partially up or against the inner side of side wall 16 to provide additional support or integrity thereto.

Further features of at least one embodiment include an opening, such as an access opening or notch, represented as 16*a*, in the side wall 16. For example, this notch or opening 16*a* can provide access into the interior portion 15 of the container 10. In one embodiment, as illustrated, the notch or opening 16 can be a recessed notch that extends off of the open end of the side wall 16, as illustrated. Although, in other embodiments, it is contemplated that the opening 16*a* is constructed as a hole or aperture through (and fully surrounded by) the side wall 16.

In any event, in at least one embodiment, the opening or notch can be used to allow a user or driver to connect a recovery strap 60 to the vehicle 1, such as to a D-Shackle 62 (or other like device or attachment) on the bumper or hitch prior to getting on the trail or operating the vehicle 1 in an off-road environment. In this manner, with the strap 60 attached to the D-Shackle 62 or other mount external to the container 10, the strap 60 can be threaded or positioned through the notch or opening 16*a* and into the interior portion 15 of the container. The strap 60 can then be retained within the container 10, for example, via one or more retaining straps 40, as described herein, until needed. If the user or driver needs access to the recovery strap, is can be easily obtained by releasing it from the retaining strap(s) 40 quickly and then attached to another vehicle. The other vehicle can then pull or tow the vehicle 1 to safety. After use, the strap 60 can be re-secured within the container 10 without having to completely disconnect it from the vehicle, D-Shackle 62 or other mount.

Without the container 10 or gear box of at least one embodiment of the present invention, if a recovery strap 60 is attached to the D-Shackle 62 or other mount, there is nowhere to put it while driving or operating the vehicle 1. So, oftentimes, the strap 60 and D-Shackle 62 are stored somewhere inside the vehicle 1, connected when needed, disconnected when done, and put it back in the vehicle.

With reference to FIGS. 7 and 8, another embodiment of the locking or latch assembly 50 configured to secure the lid 18 in the closed position relative to the rest of the body 12 is illustrated. Specifically, the locking assembly 50 illustrated in FIGS. 7 and 8 include at least one bracket 152 secured to the body 12 and at least one corresponding bracket 154*a*, 154*b* attached to the lid 18. In the embodiment shown, two brackets 154*a*, 154*b* are secured to the lid 18 and for a channel therebetween. The bracket 152 secured to the body 12 is disposed or positioned between the two brackets 154*a*, 154*b*. Each of the brackets 152, 154*a*, 154*b* include a hole that will align with one another when the lid 18 is in a closed positioned. In this manner, a padlock or other lock (not shown) can be attached through the aligned of the brackets 152, 154*a*, 154*b* to lock the lid 18 in the closed positioned. As mentioned above, other locking assemblies or latch assemblies structured and configured to removably engage or lock the lid 18 in a closed position relative to the rest of the body 12 are contemplated within the full spirit and scope of the various embodiment of the present invention.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described.

What is claimed is:

1. A storage container for universal attachment to a spare tire assembly mounted to an exterior of a vehicle, the spare tire assembly comprising a spare tire mounted on a wheel, the wheel comprising a plurality of spokes, said storage container, comprising:
   a cylindrical body defining an interior portion, said cylindrical body comprising a base, at least one cylindrical wall extending from said base, and a lid,
   said base comprising a plurality of holes disposed there through, and
   a mounting strap routed through a first one of said plurality of holes disposed on said base, into the wheel of the spare tire assembly, at least partially around and behind at least one of the plurality of spokes of the wheel, and through a second one of said plurality of holes disposed through said base, for mounting said cylindrical body to the exterior of the vehicle,
   wherein, when said cylindrical body is mounted to the exterior of the vehicle, a first portion of said mounting strap is disposed external to said cylindrical body and a second portion of said mounting strap is disposed within said interior portion of said cylindrical body,
   wherein, when said cylindrical body is mounted to the exterior of the vehicle and said lid encloses said interior portion, said first portion of said mounting strap is completely disposed and hidden behind said cylindrical body and said second portion of said mounting strap is disposed within said interior portion of said cylindrical body such that access to said mounting strap is restricted.

2. The storage container as recited in claim 1 wherein, when said cylindrical body is mounted to the exterior of the vehicle, said first portion of said mounting strap is disposed directly behind said base and at least partially behind the at least one spoke.

3. The storage container as recited in claim 1 wherein, when said cylindrical body is mounted to the exterior of the vehicle, and said lid is disposed on said cylindrical body, access to said mounting strap is prevented.

4. The storage container as recited in claim 1 further comprising at least one retaining strap positioned through at least two of said plurality of holes in said base and which is configured to further secure at least one item to an inside surface of said base.

5. The storage container as recited in claim 4 further comprising a plurality of retaining straps, each of said plurality of retaining straps being positionable through at least two of said plurality of holes and configured to secure at least one item to said inside surface of said base.

6. The storage container as recited in claim 1 wherein at least some of said plurality of holes disposed through said base comprise circular holes.

7. The storage container as recited in claim 6 wherein at least some of said plurality of holes disposed through said base comprise holes with elongated configurations.

8. The storage container as recited in claim 7 wherein at least some of said holes with elongated configurations are disposed proximate an outer peripheral edge of said base.

9. The storage container as recited in claim 6 wherein said plurality of holes are spaced about a majority of a surface area of said base.

10. The storage container as recited in claim 6 wherein said base comprises at least twenty holes disposed there through.

11. The storage container as recited in claim 6 wherein said base comprises at least forty holes disposed there through.

12. A storage container configured for attachment to a spare tire assembly mounted to an exterior of a vehicle and for retaining a plurality of items, the spare tire assembly comprising a spare tire mounted on a wheel, the wheel comprising a plurality of spokes, said storage container, comprising:
   a body defining an at least partially open interior portion,
   said body comprising a base, at least one wall, and a lid,
   said base comprising an interior surface within said interior portion of said body, and an exterior surface, said base comprising a plurality of holes extending between said interior surface and said exterior surface,
   a mounting strap for mounting said body to and against the spare tire assembly, said mounting strap being routed from said interior portion of said body through a first one of said plurality of holes of said base, directly into the wheel of the spare tire assembly from a position directly adjacent said base, at least partially around and behind at least one of the plurality of spokes of the wheel, through a second one of said plurality of holes of said base, and secured within said at least partially open interior portion of said body,
   wherein, when said body is mounted to and against the spare tire assembly, a first portion of said mounting strap is disposed external to said body and a second portion of said mounting strap is disposed within said interior portion of said body,
   wherein, when said body is mounted to and against the spare tire assembly, said first portion of said mounting strap is disposed and hidden behind said body and at least partially around the at least one of the plurality of spokes, and said second portion of said mounting strap is disposed within said interior portion of said body such that access to said first portion of said mounting strap is prevented, and
   said plurality of holes being configured to receive at least one retaining strap for securing at least one of the plurality of items against said interior surface of said base.

13. The storage container as recited in claim 12 wherein at least some of said plurality of holes of said base comprise circular configurations.

14. The storage container as recited in claim 13 wherein at least some of said plurality of holes disposed through said base comprise holes with elongated configurations.

15. The storage container as recited in claim 14 wherein at least some of said holes with elongated configurations are disposed proximate an outer peripheral edge of said base.

16. The storage container as recited in claim 15 wherein said plurality of holes are spaced about a majority of a surface area of said base.

17. A storage container configured for attachment to a spare tire assembly mounted to an exterior of a vehicle and for retaining a plurality of items, the spare tire assembly comprising a spare tire mounted on a wheel, the wheel comprising a plurality of spokes, said storage container, comprising:
   a body defining an interior portion,
   said body comprising a base, at least one side wall, and a lid,
   said base comprising an interior surface within said interior portion of said body, and an exterior surface opposite said interior surface, said base comprising a plurality of holes extending between said interior surface and said exterior surface,
   said plurality of holes being spaced about a majority of a surface area of said base,
   a flexible mounting strap positioned through a first one of said plurality of holes of said base, directly into the wheel of the spare tire assembly from a side of the wheel facing said body and between two of the plurality of spokes of the wheel, at least partially around and behind at least one of the plurality of spokes, through a second one of said plurality of holes of said base, and secured within said interior portion of said body, and
   a plurality of retaining straps positioned through at least some of said plurality of holes, said plurality of retaining straps being configured to secure at least some of the plurality of items against said interior surface of said base.

18. The storage container as recited in claim 17 wherein said flexible mounting strap comprises an adjustable ratcheting mechanism disposed within said interior portion of said body when said body is mounted to and against the spare tire assembly.

19. The storage container as recited in claim 17 further comprising an access opening disposed through said at least one side wall providing access into said interior portion of said body.

20. The storage container as recited in claim 19 wherein said access opening in said at least one side wall is structured to allow access into said interior portion of said body even when said lid is disposed in a closed position relative to said body.

* * * * *